United States Patent [19]

Fujikawa

[11] 4,356,871
[45] Nov. 2, 1982

[54] HYDRAULIC CONTROL SYSTEM FOR A ROCK DRILL

[75] Inventor: Kozo Fujikawa, Hiroshima, Japan
[73] Assignee: Toyo Kogyo Co., Ltd., Hiroshima, Japan
[21] Appl. No.: 194,391
[22] Filed: Oct. 6, 1980
[30] Foreign Application Priority Data
   Oct. 6, 1979 [JP] Japan .................. 54-128991
[51] Int. Cl.³ .................. B23Q 5/00; E21C 5/16
[52] U.S. Cl. .................. 173/8; 173/11; 173/19
[58] Field of Search .................. 173/4–11, 173/19, 105
[56] References Cited
   U.S. PATENT DOCUMENTS
   3,561,542  2/1971  Hanson .................. 173/5
   3,823,784  7/1974  Feucht .................. 173/11
   3,979,944  9/1976  Salmi et al. .................. 173/8
   4,074,771  2/1978  Morrison .................. 173/11
   4,246,973  1/1981  Mayer .................. 173/8

Primary Examiner—Stephen G. Kunin
Assistant Examiner—K. Bradford Adolphson
Attorney, Agent, or Firm—Fleit & Jacobson

[57] ABSTRACT

A rock drill having a hydraulic system for controlling a striking, rotating and advancing movements of a drilling rod. The advancing or forward feeding conduit for a feed actuator is provided with a relief valve which is responsive to the pressure in the positive rotating conduit for a rotary actuator so that the pressure in the forward feeding conduit is relieved to weaken the advancing force when the load on the rotary actuator is increased. A further relief valve is also provided for relieving the pressure in the striker conduit to weaken the striking force. A switching valve is provided between the advancing and retreating conduits for the feed actuator so that the direction of movement of the feed actuator is automatically changed when there is an abrupt decrease in the pressure in the striker conduit.

5 Claims, 2 Drawing Figures

HYDRAULIC CONTROL SYSTEM FOR A ROCK DRILL

SUMMARY OF THE INVENTION

The present invention relates to a rock drill and more particularly to a hydraulic control system for a rock drill.

In general, a rock drill includes a guide cell carrying a drifter which is provided with a hydraulically operated drilling rod. The hydraulic system for actuating the drilling rod includes a striking actuator for applying striking movements to the drilling rod, a reversible rotary actuator for rotating the rod and a reversible feed actuator for advancing the drifter along the guide cell. In conventional rock drills, problems have been encountered when the drilling rod is advanced through rocks of varying hardness. When the drilling rod is advanced from a relatively hard layer to a relatively soft layer or to a layer of soil, there will be an abrupt increase in the advancing speed of the rod so that the rod driving torque will correspondingly be increased. This will cause the driving rod to be jammed and clogged in the rock so that there is a high possibility of the rod being damaged.

It is therefore an object of the present invention to provide a rock drill with hydraulic control system by which the drilling rod can appropriately be controlled when it is advanced from a relatively hard rock layer to a relatively soft layer.

Another object of the present invention is to provide a rock drill in which the drilling rod can automatically be retreated when the rod jamming and clogging are produced or when the drilling operation is completed.

According to the present invention, the above and other objects can be accomplished by a rock drill comprising drilling rod means, striking actuator means for applying striking movements to said drilling rod means, reversible rotary actuator means for rotating the drilling rod means, reversible feed actuator means for advancing and retreating said drilling rod means, first conduit means connected with said striking actuator means for providing a supply of pressurized fluid to the striking actuator means to produce the striking movements of the striking actuator means, second conduit means connected with said rotary actuator means for providing a supply of pressurized fluid so that a positive driving rotation is produced in the rotary actuator means, advancing conduit means connected with said feed actuator means for providing a supply of pressurized fluid so that a rod advancing movement is produced in the feed actuator means, retreating conduit means connected with said feed actuator means for providing a supply of pressurized fluid so that a rod retreating movement is produced in the feed actuator means, first pressure relief means provided in said advancing conduit means and responsive to a pressure in the second conduit means to relieve the pressurized fluid in the advancing conduit means when the pressure in the second conduit means is increased beyond a first predetermined value, second pressure relief means provided in the first conduit means and responsive to a pressure difference between the advancing and retreating conduit means to relieve the pressurized fluid in the first conduit means when the pressure in the advancing conduit is not higher than that in the retreating conduit by a second predetermined value, control valve means provided in the first conduit means for relieving the pressurized fluid in the first conduit means when a predetermined distance of drilling is performed, switching valve means provided between the advancing and retreating conduit means for alternately connecting the advancing and retreating conduit means to pressurized fluid source means in accordance with a pressure in the first conduit means, means for controlling said switching valve means so that the pressurized fluid is introduced into the retreating conduit when there is an abrupt decrease in the pressure in the first conduit means.

The means for controlling the switching valve means may comprise pressure conduit means for leading the pressure in the first conduit means to one side of the switching valve means so that the switching valve means is forced toward a position wherein it connects the pressurized fluid source means to the advancing conduit means, and balancing conduit means for leading the pressure in the first conduit means to the opposite side of the switching valve means so that the switching valve means is forced toward another position wherein it connects the pressurized fluid source means to the retreating conduit means, said balancing conduit means being provided with non-return valve means and pressure accumulator means so that the switching valve means is moved to said another position, when there is an abrupt decrease in the pressure in the first conduit means, under the pressure in said opposite side of the switching valve means. According to the features of the present invention, the drilling rod can thus be automatically retreated whenever the drilling stroke is completed or the driving torque is increased beyond a certain level. Thus, it is possible to prevent the driving rod from being jammed and clogged.

In a preferable aspect of the present invention, the advancing conduit means is provided with pressure accumulating means for delaying transmittal of the pressurized fluid to the feed actuator means when the pressurized fluid is introduced into the advancing conduit means, one way restriction means provided between the advancing conduit means and the second pressure relief means for delaying transmittal of pressure from the advancing conduit means to the second pressure relief means, so that the advancing and striking forces on the drilling rod are weakened during initial stage of drilling operation. The second conduit means may be provided with third pressure relief means which is responsive to a pressure difference between the advancing and retreating conduit means for relieving the pressure in the second conduit means when the pressure difference is below a third predetermined value.

BRIEF DESCRIPTION OF THE DRAWINGS

The above and other objects and features of the present invention will become apparent from the following descriptions of preferred embodiments taking reference to the accompanying drawings, in which.

DESCRIPTION OF THE PREFERRED EMBODIMENT

Figure 1:
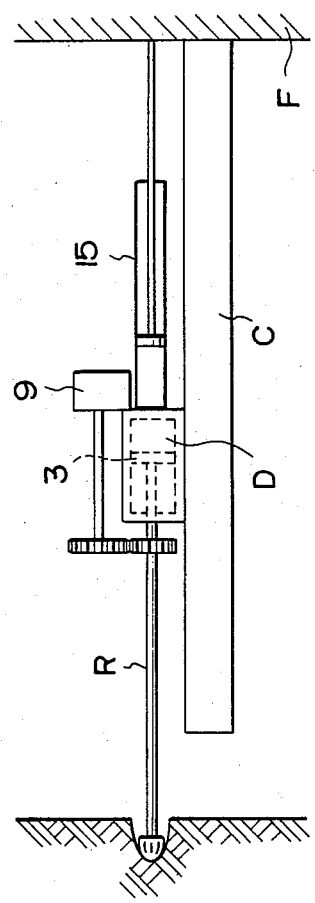
FIG. 1 is a diagrammatical side view of a rock drill to which the present invention can be applied; and, FIG. 2 is a diagram of a hydraulic system in accordance with one embodiment of the present invention.

Referring now to the drawings, particularly to FIG. 1, the rock drill shown therein includes a guide cell C supported on a stationary part or frame F. The guide cell C carries a drifter D which is movable longitudinally along the guide cell C. A hydraulic type feed actuator 15 is provided for effecting advancing and retreating movements of the drifter D. The drifter D has a drilling rod R which extends forwardly from the drifter D. The drilling rod R is rotatable with respect to the drifter D and a reversible hydraulic motor 9 is provided for rotating the rod R. In the drifter D, there is provided a hydraulically actuated striker 3 for striking an end of the rod R.

Figure 2:
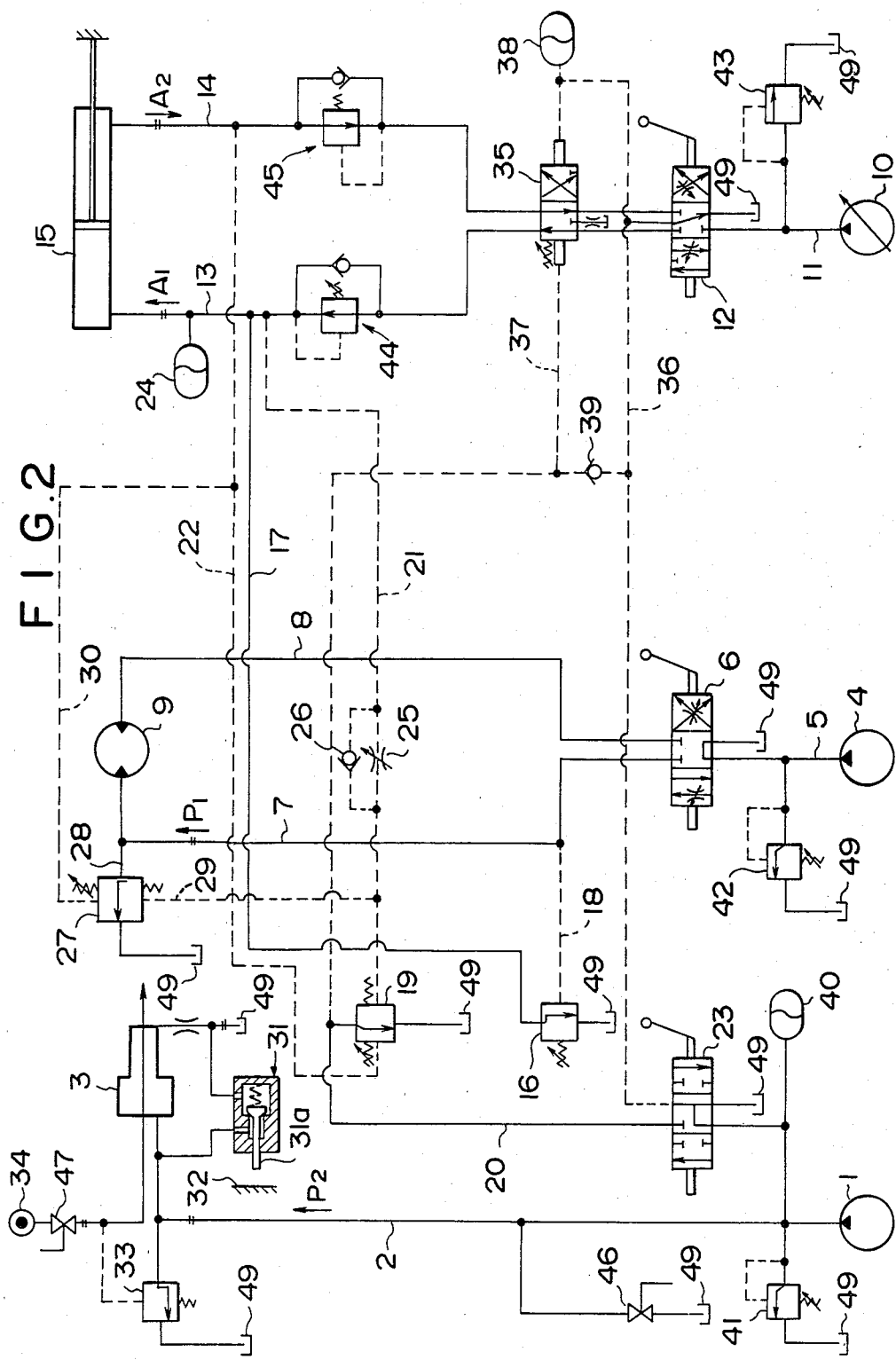

Referring to FIG. 2, the hydraulic system shown therein includes a striking hydraulic pump 1 which has an outlet port connected through a striker conduit 2 to the striker 3 so as to provide a supply of pressurized hydraulic fluid to the striker 3 to operate the same. In the hydraulic system, there is also provided a motor driving hydraulic pump 4 which has an outlet conduit 5 connected through a three position selector valve 6 and then through a positive conduit 7 and a reverse conduit 8 with the motor 9. The valve 6 has a positive position, a neutral position and a reverse position. In the positive position, the valve 6 connects the conduit 7 to the conduit 5 and the conduit 8 to a reservoir 49 so that the motor 9 is rotated in the positive direction. In the reverse position, the conduit 8 is connected with the conduit 5 so that the motor 9 is rotated in the reverse direction. In the neutral position, the conduits 7 and 8 are disconnected from the conduit 5 so that the motor 9 is stopped.

In order to drive the feed actuator 15, there is provided a variable displacement type hydraulic pump 10 which has an outlet conduit 11 connected through a three position selector valve 12 and then through an advancing conduit 13 and a retreating conduit 14 with the actuator 15. The valve 12 has an advancing position, a neutral position and a retreating position. In the advancing position, the pump outlet conduit 11 is connected with the advancing conduit 13 to operate the actuator 15 in the advancing direction. In the retreating position, the valve 12 connects the conduit 11 with the conduit 14 so that the actuator 15 is moved in the retreating direction. In the neutral position, the conduits 13 and 14 are disconnected from the conduit 11.

The advancing conduit 13 is provided with a first relief valve 16 which is connected thereto through a bleed-off conduit 17. The valve 16 is of a pressure responsive type and a hydraulic pressure is applied thereto from the positive conduit 7 through a pilot conduit 18. It should be noted that the first relief valve 16 is opened when the pressure in the conduit 7 is increased beyond a predetermined value to relieve the pressure in the conduit 13 to the reservoir 49 so that the advancing effort by the actuator 15 is weakened.

The striking conduit 2 is provided with a second relief valve 19 which is connected thereto through a bleed-off conduit 20. The conduit 20 is provided with a selector valve 23 which has a striking position and a neutral position. In the striking position, the conduit 2 is connected with the relief valve 19 and, in the neutral position, the conduit 2 is opened to the reservoir 49. The second relief valve 19 thus operated only in the striking position of the selector valve 23 and is applied on one hand with the pressure in the advancing conduit 13 and on the other hand with the pressure in the retreating conduit 14, respectively through conduits 21 and 22 so that it is opened when the pressure difference between the conduits 13 and 14 is below a predetermined value or the pressure in the conduit 13 is lower than that in the conduit 14 to thereby weaken the striking force which is applied by the striker 3 to the drilling rod R.

In FIG. 2, it will be noted that the advancing conduit 13 is provided with an accumulator 24 downstream of the position where the conduit 21 is connected with the conduit 13. The accumulator 24 functions to delay building up of high pressure in the actuator 15 so that, when the drilling rod R is abutted to a rock, the forward feeding force applied thereto is restricted for a certain period of time. It should further be noted that the conduit 21 is provided with a flow restriction 25 and in parallel with the restriction 25 there is provided a check valve 26 which opens only toward the conduit 13. It will thus be understood that transmittal of hydraulic pressure from the conduit 13 to the relief valve 19 is delayed by the restriction 25 when a high pressure is built up in the conduit 13 to thereby maintain the relief valve 19 in the open position and thus weaken the striking force of the striker 3.

In the embodiment shown in FIG. 2, the positive conduit 7 is provided with a third relief valve 27 which is connected thereto through a bleed-off conduit 28. The relief valve 27 is applied on one hand with the pressure in the advancing conduit 13 and on the other hand with the pressure in the retreating conduit 14. For the purpose, the relief valve 27 is provided with a conduit 29 connected with the conduit 21 downstream of the restriction 25 and with a conduit 30 connected with the conduit 22. The relief valve 27 is thus opened when the absolute value of the pressure difference between the conduits 13 and 14 is below a predetermined value to thereby relieve the pressure in the conduit 7 to the reservoir 49 and weaken the driving torque of the motor 9.

The striking conduit 2 is provided with a limiting valve 31 which has a push-rod 31a adapted to engage with a stopper 32 and open the valve 31 to relieve the pressure in the conduit 2 to the reservoir 49 so as to stop the striking operation. The striking conduit 2 is further provided with a flushing water responsive relief valve 33 which is responsive to the flow of flushing water supplied from a water source 34 through a valve 47 to the striker 3 so that, when there is any shortage of flushing water, the pressure in the conduit 2 is relieved to stop the operation of the striker 3.

In the advancing conduit 13 and the retreating conduit 14, there is provided a pilot type switching valve 35 for reversing the direction of operation of the actuator 15. The valve 35 is therefore connected with the conduit 20 on one hand through a conduit 37 and on the other hand through a check valve 39 and a conduit 36. The conduit 36 is provided with an accumulator 38 so that, when the relief valve 19 is opened or the push-rod 31a of the limiting valve 31 abuts the stopper 32 and the pressure in the conduit 20 is therefore abruptly decreased, there will be produced a pressure difference between the conduits 36 and 37. When the pressure difference increases beyond a predetermined value, the valve 35 is actuated to reverse the direction of operation of the actuator 15 to thereby retreat the drilling rod R. The conduits 36 and 37 are connected with the valve 23 so that they are opened to the reservoir 49 when the valve 23 is in the neutral position.

In the illustrated hydraulic circuit, there are also provided an accumulator 40 in the conduit 20 and appropriate relief valves 41, 42 and 43 for conduits 2, 5 and 11, respectively. The conduits 13 and 14 may be provided with pressure reducing valves 44 and 45, respectively. The conduit 2 may be provided with a drain valve 46.

In operation, the pressure in the advancing conduit 13 is relatively low when the drilling rod R is being advanced until the leading end of the rod R engages the rock. Thus, the pressure difference between the conduits 13 and 14 is small so that the second relief valve 19 and the third relief valve 27 are opened. It will therefore be understood the pressure in the striking conduit 2 is relieved through the conduit 20 so that the operation of the striker 3 is weakened. Further, the pressure in the conduit 7 is also relieved through the conduit 28 so that the driving torque of the motor 9 is weakened.

As soon as the leading end of the drilling rod R engages the rock, there will be an increase in the pressure in the conduit 13 due to an increase in the driving load. The high pressure built up in the conduit 13 is not at once transmitted to the actuator 15 but the transmittal of the pressure is delayed for a moment due to the provision of the accumulator 24. Further, the transmittal of the pressure in the conduit 13 to the second and third relief valves 19 and 27 is also delayed due to the existence of the flow restriction 25. Thus, in the initial period, the drilling operation is performed with a relatively small striking force, driving torque and advancing force to form a pilot portion of the drilled bore. This will make it possible to perform the drilling operation in an accurate manner.

After the aforementioned time delay, the high pressure in the conduit 13 is transmitted to the actuator 15 to increase the advancing or forward feeding force. At the same time, the high pressure in the conduit 13 is also transmitted to the relief valves 19 and 27 to close them. Thus, a high pressure is built up in the conduit 2 to increase the striking force of the striker 3. Similarly, a high pressure is also built up in the conduit 7 to increase the driving torque of the motor 9. The pressure in the conduit 2 is transmitted through the conduit 37 and also through the conduit 36 to the switching valve 35 which is maintained at this moment under the spring bias force in the position shown in FIG. 2 wherein it connects the pump outlet conduit 11 with the advancing conduit 13. Thereafter a normal drilling operation is performed.

In normal drilling operation, if the drilling rod R passes through a relatively hard rock to a relatively soft rock or to a layer of soil, there will be an abrupt increase in the advancing speed and therefore in the driving torque. Thus, there will be a pressure increase in the conduit 7. As soon as the pressure in the conduit 7 exceed a predetermined value, the first relief valve 16 is opened to thereby relieve the pressure in the advancing conduit 13 through the bleed-off conduit 17. Similar pressure decrease is also produced in the advancing conduit 13 when the drilling rod R encounters a void in the rock. Thus, the pressure in the conduit 13 is decreased and the forward feeding force is thereby weakened. The pressure decrease in the conduit 13 causes a decrease in the pressure difference between the conduits 13 and 14 so that the second and third relief valves 19 and 27 are opened. Thus, the striking and rotating forces are weakened as in the initial period of the drilling operation. As soon as the relief valve 19 is opened, the pressure in the conduit 2 is relieved through the relief valve 19 and the pressure decreases in the conduit 2 is transmitted through the conduit 37 to the switching valve 35. However, a high pressure is maintained in the conduit 36 due to the existence of the accumulator 38 and the non-return valve 39. Therefore, the valve 35 is moved to a position wherein it connects the pump outlet conduit 11 with the retreating conduit 14. It will therefore be understood that the feed actuator 15 is moved in the retreating direction and the drilling rod R is automatically retreated. It has been found that the arrangement is effective in performing a drilling operation through a relatively soft or weak earth layer. It should be noted that a satisfactory result can be obtained without the third relief valve 27.

When the push-rod 31a of the limiting valve 31 abuts the stopper 32 at the end of a normal drilling stroke, the valve 31 is opened and the pressure in the valve 31 is relieved through the valve 31. Thus, the pressure in the conduit 2 is decreased to thereby switch the valve 35 and the feed actuator 15 is automatically moved in the retreating direction. In the operation wherein the drilling rod R is being retreated, a high pressure is built up in the retreating conduit 14 so that there is a sufficient pressure difference between the conduits 13 and 14 to close the third relief valve 27. However, since the pressure in the conduit 13 is lower than that in the conduit 14, the second relief valve 19 is opened. Thus, the drilling rod R is rotationally driven with a high torque but applied with only a slight striking force when it is being retreated. In the arrangement shown in FIG. 2, the conduit 29 may not be connected with the conduit 21 downstream of the flow restriction 25 but it may be connected with the conduit 13 between the accumulator 24 and the actuator 15.

The invention has thus been shown and described with reference to a specific embodiment, however, it should be noted that the invention is in no way limited to the details of the illustrated arrangements but changes and modifications may be made without departing from the scope of the appended claims.

I claim:

1. A rock drill comprising drilling rod means, striking actuator means for applying striking movements to said drilling rod means, reversible rotary actuator means for rotating the drilling rod means, reversible feed actuator means for advancing and retreating said drilling rod means, first conduit means connected with said striking actuator means for providing a supply of pressurized fluid to the striking actuator means to produce the striking movements of the striking actuator means, second conduit means connected with said rotary actuator means for providing a supply of pressurized fluid so that a positive driving rotation is produced in the rotary actuator means, advancing conduit means connected with said feed actuator means for providing a supply of pressurized fluid so that a rod advancing movement is produced in the feed actuator means, retreating conduit means connected with said feed actuator means for providing a supply of pressurized fluid so that a rod retreating movement is produced in the feed actuator means, first pressure relief means provided in said advancing conduit means and responsive to a pressure in the second conduit means to relieve the pressurized fluid in the advancing conduit means when the pressure in the second conduit means is increased beyond a first predetermined value, second pressure relief means provided in the first conduit means and responsive to a pressure difference between the advancing and retreating conduit means to relieve the pressurized fluid in the first conduit means when the pressure in the advancing conduit is not higher than that in the retreating conduit by a second predetermined value, control valve means provided in the first conduit means for relieving the pressurized fluid in the first conduit means when a predetermined distance of drilling is performed, switching valve means provided between the advancing and retreating conduit means for alternately connecting the advancing and retreating conduit means to pressurized fluid source means in accordance with a pressure in the first conduit means, means for controlling said switching valve means so that the pressurized fluid is introduced into the retreating conduit when there is an abrupt decrease in the pressure in the first conduit means.

2. A rock drill in accordance with claim 1 in which said means for controlling the switching valve means comprises pressure conduit means for leading the pressure in the first conduit means to one side of the switching valve means so that the switching valve means is forced toward a position wherein it connects the pressurized fluid source means to the advancing conduit means, and balancing conduit means for leading the pressure in the first conduit means to the opposite side of the switching valve means so that the switching valve means is forced toward another position wherein it connects the pressurized fluid source means to the retreating conduit means, said balancing conduit means being provided with non-return valve means and pressure accumulator means so that the switching valve means is moved to said another position, when there is an abrupt decrease in the pressure in the first conduit means, under the pressure in said opposite side of the switching valve means.

3. A rock drill in accordance with claim 1 in which the advancing conduit means is provided with pressure accumulating means for delaying transmittal of the pressurized fluid to the feed actuator means when the pressurized fluid is introduced into the advancing conduit means, so that the advancing force on the drilling rod is weakened during initial stage of drilling operation.

4. A rock drill in accordance with claim 1 in which one way restriction means is provided between the advancing conduit means and the second pressure relief means for delaying transmittal of pressure from the advancing conduit means to the second pressure relief means so that the striking force on the drilling rod is weakened during initial stage of drilling operation.

5. A rock drill in accordance with claim 1 in which said second conduit means is provided with third pressure relief means which is responsive to a higher one of the pressures in the advancing and retreating conduit means to relieve the pressure in the second conduit means when the higher pressure is below a predetermined value.

* * * * *